Aug. 23, 1966     H. S. GOODMAN     3,267,633
PACKAGE AND METHOD FOR MANUFACTURING SUCH PACKAGE
Filed Feb. 5, 1963     2 Sheets-Sheet 1
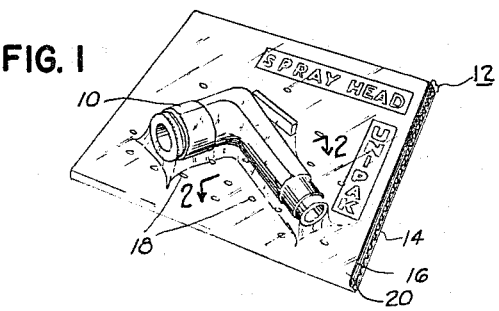
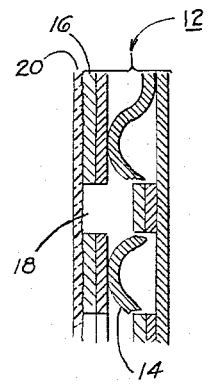
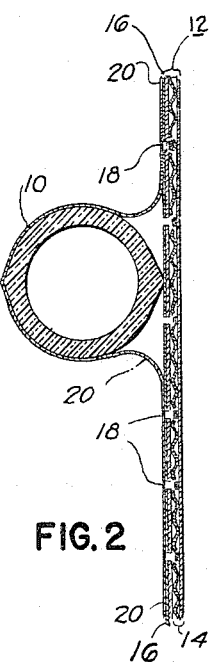
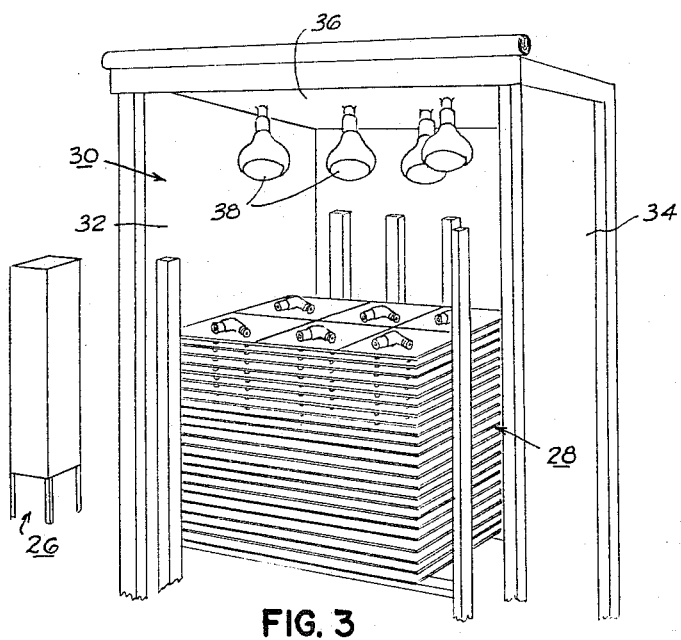
INVENTOR.
HAROLD S. GOODMAN
BY
*Robert S. Crooker*
ATTORNEY Aug. 23, 1966     H. S. GOODMAN     3,267,633

PACKAGE AND METHOD FOR MANUFACTURING SUCH PACKAGE

Filed Feb. 5, 1963     2 Sheets-Sheet 2

*INVENTOR.*
HAROLD S. GOODMAN
BY
*Robert J. Crooke*
*ATTORNEY*

United States Patent Office 3,267,633
Patented August 23, 1966

3,267,633
PACKAGE AND METHOD FOR MANUFACTURING SUCH PACKAGE
Harold S. Goodman, 51 Marcellus Drive,
Newton Center 59, Mass.
Filed Feb. 5, 1963, Ser. No. 256,429
8 Claims. (Cl. 53—22)

My invention relates to improvements in "skin-packaging" methods, and to packaged articles of merchandise wherein the packages are manufactured by such improved methods.

More particularly, my invention relates to methods for skin packaging, and to packages produced by such methods, wherein one or more articles of merchandise are positioned on the surface of a backing board and are covered by an overlying layer of plastic film which is bonded to the surface of the backing board around the articles of merchandise.

Still more particularly, my invention relates to methods of skin packaging, and to packages produced thereby, wherein a pre-treatment is given to the articles of merchandise, the backing board, and the plastic film before formation of the package, in order to achieve a package in which the adhesion of the plastic film to the backing board is excellent and does not deteriorate with time, in which there is substantially no cloudiness within the package, and which is strong enough to retain its structural integrity even when the articles of merchandise in the package are large and heavy.

In the "skin-packaging" process, articles of merchandise are positioned on a stiff backing board of heavy paperboard, or some such material, and are then disposed for covering by a film of clear thermoplastic material. A sheet of the skin-packaging film of clear thermoplastic material is usually clamped in a frame and is heated until it softens and becomes easy to stretch or deform. Then the clamped sheet of soft thermoplastic film is lowered over the articles and the backing board, and allowed to "drape" so that it conforms to the contours of the articles and so that it laminates with the surface of the backing board around the articles of merchandise. Suction is applied below or behind the backing board, so that the differential air pressure forces the soft thermoplastic film to drape closely about the articles of merchandise and to cling tightly and smoothly to the surface of the backing board around the articles of merchandise.

When the thermoplastic film material has been allowed to cool and has been trimmed so that it is co-extensive with the edges of the backing board, the package of merchandise is complete and ready to be placed on display for sale. If such a package of merchandise were properly made, it would display the merchandise in a high state of visibility while at the same time protecting it against damage and pilferage. The package would be strong enough for shipment and could also furnish a means of identification of the articles through the use of printed or pictorial matter placed on the backing board around the articles of merchandise. By making a hole in the edge of the backing board, a convenient means could be furnished for hanging up the packaged articles for display in a store. Articles such as plumbing supplies and hardware are particularly well adapted to be packaged and displayed in properly made skin packages.

Unfortunately, it has been found that such packages produced in practice often do not achieve a good bond between the layer of thermoplastic-film packaging material and the surface of the backing board, so that the thermoplastic film tends to strip away from the surface of the backing board either at the edges of the board or adjacent the articles of merchandise. Moreover, it has often been difficult to achieve the proper pressure differential to force the plastic film into firm contact with the backing board if the backing board is stiff enough, and hence thick enough, to support the articles properly.

If the plastic film strips away or delaminates *near the edges* of the backing board, the appearance of the package is impaired. If the plastic film delaminates from the surface of the backing board *adjacent the articles of merchandise*, the appearance of the package is impaired, and also the articles are no longer tightly held to the surface of the backing board. In that event, it is likely that the articles will move around within the package until they have punctured the plastic film and caused still more of the plastic film to delaminate from the backing board. Moreover, such packages have often not been strong enough to retain in position and protect comparatively large and heavy articles such as plumbing or toilet seats.

Sometimes, in prior-art types of skin packages, the bond between the plastic film and the backing board has deteriorated with time even though it appeared to be satisfactory immediately after the packaging operation. Occasionally, unsightly blisters have formed between the plastic film and the backing board or between the plastic film and the articles of merchandise. In any event, the full potentialities of the skin-packaging technique have until now failed to be realized either as to strength of the package or as to its appearance.

Accordingly, it is an object of my invention to provide an improved method for skin packaging, and to achieve merchandise packages in which the plastic film of packaging material adheres tenaciously and smoothly to the surface of the backing board.

It is another object of my invention to provide an improved skin-packaging method whereby packages that are strong enough to support and protect comparatively heavy articles of merchandise can be achieved.

It is still another object of my invention to provide a method for making skin packages that will not deteriorate with time, and that will remain free from blisters between the plastic film and the articles of merchandise, and between the plastic film and the backing board.

It is a further object of my invention to provide a skin-packaging method in which the plastic film is caused to follow closely the contours of the packaged articles of merchandise but in which the plastic film does not actually adhere to the articles of merchandise so as to make removal of the film from the articles difficult when the package is opened.

It is a still further object of my invention to provide a skin-packaging method capable of producing packaged articles of merchandise that are excellent in strength, attractiveness, durability, and economy.

Briefly, I am able to fulfill these and other objects of my invention by properly preparing the plastic film, the backing board, and the articles of merchandise prior to completion of the package. I preheat the backing board and the articles of merchandise, as well as the plastic film. I also thoroughly dry the backing board and the articles of merchandise before the sheet of plastic film is applied thereto. I achieve a very compact and well compressed package, and at the same time a *strong* package, by securing maximum effectiveness of the pressure differential in forcing the plastic film into intimate contact with the surface of the backing board. By use of perforations at least part way through the backing board, I am able to achieve maximum pressure differential across the combination of the plastic film and the backing board, while at the same time I can employ a backing board that is thick enough and stiff enough to support large and heavy articles of merchandise.

For a full understanding of my invention, reference is made to the following complete specification, taken in conjunction with the appended claims and the accompanying drawings, wherein:

FIGURE 1 is a perspective view of a packaged kitchen-sink spray head, skin-packaged in accordance with the principles of my invention;

FIGURE 2 is a transverse cross-sectional view of the packaged kitchen-sink spray head shown in perspective in FIGURE 1, not necessarily to scale. An enlarged portion of this cross-sectional view is shown in FIGURE 2(a);

FIGURE 3 is a perspective view of an open oven and dehumidifier for preheating and drying a stack of backing boards, each supporting articles of merchandise to be packaged;

Figure 6:
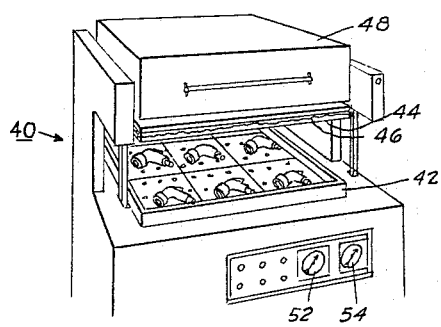
Figure 7:
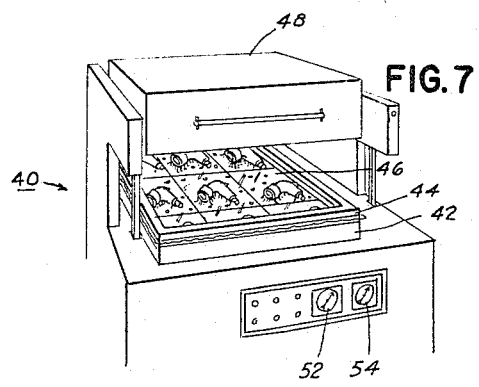

FIGURE 6 is a perspective view of a portion of a skin-packaging machine, showing the heating units pulled forward over the clamping frame carrying the plastic film, in position to heat the film; and FIGURE 7 is a perspective view of a portion of a skin-packaging machine, showing the heated film in position over the merchandise and backing boards, and being pressed into intimate contact therewith, by the pressure differential across the packages.

"Skin packaging" of articles of merchandise is one of the most promising ways to prepare such articles, both for shipment and for display. Skin packaging is more economical than another method of plastic packaging called "*blister* packaging" because in the latter method a distinct mold is required in order to prepare a plastic "blister" to be fastened to a backing board in packaging each type of article. In *skin* packaging, on the other hand, the article of merchandise itself serves as the "mold" by which the plastic film is shaped. Thus, skin packaging requires less capital investment than blister packaging and also results in a package which fits the articles more closely, thus preventing waste of space and improving the strength of the package. However, as has been pointed out, the potential advantages of skin packaging have until now not been fully realized because the optimum strength and permanence of the skin package have not been achieved. According to the principles of my invention, I have achieved such optimum strength and permanence in a package such as is shown in FIGURE 1. In that package, a kitchen-sink spray head 10 is supported on a backing board 12 comprising a layer of corrugated board 14 and a layer of porous, uncoated paper 16 laminated thereto by means of an ordinary paper adhesive. The layer of porous, uncoated paper 16 may have printed thereon a description of the article of merchandise in the package. Such description may be printed on paper 16 by a process such as offset printing, which should employ an ink that is not greasy or slow-drying. A water-base ink is suitable for this purpose.

When the layer of porous, uncoated paper 16 has been printed and laminated to the layer of corrugated board 14, I usually make perforations, such as are shown at 18, through the paper 16 and at least part way through the corrugated board 14. Such perforations can be formed by means of a die, and may be approximately one-eighth inch in diameter. In backing boards for relatively small articles of merchandise, I employ corrugated board approximately one-eighth inch thick, whereas for larger articles of merchandise requiring more stiffness of the backing board I sometimes employ corrugated board as thick as one-quarter inch. For the portions of the surface of the backing board on which the articles of merchandise are to be mounted, I employ approximately one perforation per square inch of surface of backing board. If printing on the surface of the backing board is not required, the layer of paper 16 may be omitted, and the plastic film bonded directly to corrugated board 14.

While I prefer to employ corrugated board for the stiffening member of backing board 12, it will be understood that other fibrous materials may also be employed. Whatever the nature of the board, it should be porous and should not be coated with any material that would prevent the passage of air therethrough. The importance of using a fibrous board, and of forming perforations 18 therein, lies in facilitating the passage of air through backing board 12 when the pressure differential is applied thereto to draw the plastic film down into intimate contact with backing board 12. The use of corrugated board for this purpose is advantageous in that the air can pass through perforations 18 and through the channels of the corrugated board 14 in order to permit proper "drawdown" of the plastic packaging film by exhausting the air from under the film. Even though the corrugated board may be faced with paper on both surfaces, the pores and the perforations in the facing paper permit passage of air therethrough. If an extremely porous board is used for the stiffening member of backing board 12, it may not be necessary to have perforations 18 penetrate the entire backing board. However, I have found that the perforations should penetrate the layer of paper 16, if such a layer is employed.

Various types of materials may be employed in the plastic film 20 which constitutes the outer layer of the skin package. Among these materials are the following:

(1) Cellulose acetate.
(2) Vinyl.
(3) Polyethylene.
(4) Laminations of cellulose acetate with polyethylene.
(5) Polyethylene treated by electrical discharge of corona.

The material which I favor for use as the plastic film 20 is CONOFORM AA, a product of Continental Can Company. CONOFORM AA is a processed polyethylene that has been corona treated to facilitate a high degree of adhesion between the film 20 and the backing board 12.

The thickness of plastic film 20 may range from about 3 mils to 10 mils, depending upon the type of package to be formed, and the type of articles of merchandise to be packaged. In general, the heavier the article of merchandise, and the farther it extends from the surface of the backing board, the thicker should be the plastic film 20. The thicker plastic films, of course, impart greater strength to the skin package than do the thinner plastic films.

In carrying out the method according to my invention, I first fabricate backing boards 12, as described in the foregoing paragraphs, printing any markings thereon which may be required. I next position articles of merchandise in the desired locations on the surface of the backing boards, and place the backing boards and articles of merchandise in an open oven 30 as shown in FIGURE 3. I find it convenient to stack the backing boards and articles of merchandise in open oven 30 until a good-sized accumulation 28 has been built up.

The reason for preheating the backing boards and the articles of merchandise in the open oven is to dry them completely and to raise their temperature to a level such that, when the softened plastic film is draped over them in a later step of my method, the backing boards and the articles of merchandise will not draw an excessive amount of heat away from the plastic film. As an aid in drying the backing boards and the articles of merchandise, I usually carry out my skin-packaging operations in a dehumidified room. This is particularly important in humid summer weather, and is then one of the keys to the success of my method. In FIGURE 3, I have schematically represented a dehumidifier 26.

I have found that it is particularly important, not only for the backing boards and articles of merchandise to be preheated before the plastic film is applied thereto, but also for the surfaces of the backing boards and of the articles of merchandise to be quite dry. Any moisture present would tend to prevent proper bonding between the backing board and the plastic film, and might produce cloudiness or bubbles within the package. Moreover, even though the bond between the plastic film and the backing board might at first appear to be good, the presence of moisture can cause the bond to deteriorate with time, resulting in separation of the plastic film from the surface of the backing board.

Open oven 30 includes walls 32 and 34 and a ceiling 36 which supports infra-red lamps 38, directed downward toward the stack 28, of backing boards and articles of merchandise. Of course, many variations may be made in the configuration of open oven 30 and in the arrangement of the infra-red lamps 38. It would be possible to use heating elements of a type other than infra-red lamps. My experience has shown that six infra-red lamps of 375 watts each are capable of emitting and directing toward the backing boards and articles of merchandise about the right amount of heat for the purposes of this method. The surface temperature of the backing boards and the articles of merchandise becomes higher than the ambient temperature of the oven, which is approximately 120 degrees Fahrenheit. Before removing each backing board, with its articles of merchandise, from the oven, I expose it to the infra-red radiation for a period of about thirty seconds at a distance in the neighborhood of eighteen inches from the emitting surface of the infra-red lamps. I usually maintain the stack of backing boards and articles of merchandise in the oven at a level such that the topmost backing board is spaced by approximately eighteen inches (plus or minus a few inches) from the infra-red lamps.

If the articles of merchandise (such as kitchen-sink spray heads 10) have components made of plastic material, I have found that it is helpful to spray them with an aerosol suspension of silicone grease before they are positioned on the backing boards. The silicone grease will prevent the plastic film from adhering to the plastic components of the articles of merchandise when the package is complete.

Figure 4:
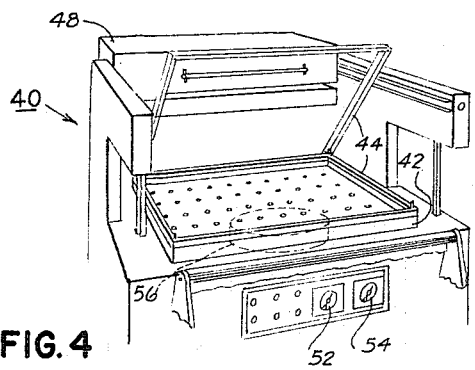
FIGURE 4 is a perspective view of a portion of a skin-packaging machine, showing the clamping frame in a position for the mounting of a sheet of plastic skin-packaging film thereon.
Figure 5:
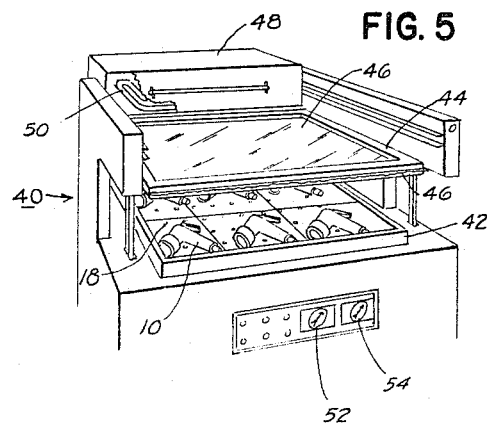
FIGURE 5 is a perspective view of a portion of a skin-packaging machine, showing the clamping frame raised into an elevated position for heating of the sheet of plastic film carried thereby, and showing a number of backing boards, each bearing an article of merchandise, in position for the plastic film to be lowered thereon.

When the backing boards and articles of merchandise have been completely dried and preheated in open oven 30, I remove the topmost ones from oven 30 and place them in a skin-packaging machine 40 as shown in FIGURE 5. I place sufficient backing boards in the machine substantially to cover the perforated platen 42 of the machine 40. Prior to placing the backing boards in the machine, I prepare the machine by mounting the plastic film in the machine as shown in FIGURE 4. I open clamping frame 44 and mount thereon a sheet of plastic film 46, securing the plastic film by hooking the corners thereof on pins at the corners of clamping frame 44 and by closing clamping frame 44 so that it grips the margins of the sheet of plastic film 46. I then raise clamping frame 44 several inches so that perforated platen 42 becomes exposed for the backing boards and articles of merchandise to be placed thereon. There are a number of commercially available skin-packaging machines in which some of these operations (such as raising and lowering clamping frame 44) can be performed semi-automatically. Typical of such commercially available machines is the Poly-Tite Packaging Machine model 500–C, marketed by Avery Industries, Inc.; Machines for Packaging Company, 333 North Bayshore Boulevard, San Mateo, California.

After the packaging machine has been prepared by mounting the film in the clamping frame 44 as shown in FIGURE 4, and by raising clamping frame 44 several inches to the position shown in FIGURE 5, the backing boards 12 and articles of merchandise 10 are placed on perforated platen 42 so as substantially to cover it. The perforations in platen 42 communicate with a suction system so that, when the suction is turned on, air can be drawn through the perforations in the platen in order to impress a pressure differential between the top surface and the bottom surface of the packages being formed on platen 42. The suction system may include a turbine 56, connected so as to draw air from under perforated platen 42, thereby causing air to flow through the perforations from the top to the bottom of the perforated platen to replace the air drawn away by the turbine. A timer 54 may be provided in order to turn the turbine on and off semi-automatically, allowing a pre-determined operating time during which the pressure differential is applied to the packages being formed on the top surface of perforated platen 42.

When clamping frame 44 and the sheet of plastic film 46 have been elevated, and when backing boards 12 and articles of merchandise 10 have been placed on perforated platen 42 as shown in FIGURE 5, the heater hood 48 of the packaging machine is pulled into position over the sheet of plastic film 46, as shown in FIGURE 6. Heater hood 48 houses several heating units 50, which may be Calrod units or some similar type of electrical resistance units, connected to a source of high electric current. Heating units 50 should be capable of rapid heating when the electric current through them is turned on. Another possible material for heating units 50 is Incaloy, a resistance alloy produced by International Nickel Company.

The Poly-Tite Packaging Machine model 500–C is equipped with a switch so disposed that, when heater hood 48 is pulled into position over the sheet of plastic film 46, the electric current in heating units 50 is automatically turned on. This type of machine is also equipped with a timer 52, so connected that the heating current through heating units 50 can be made to flow for a pre-determined number of seconds each time the switch is turned on. The machine is so arranged that, when the pre-determined number of seconds of heating time has elapsed, clamping frame 44 and the heated sheet of plastic film 46 are caused to drop to the level of the backing boards 12 and the articles of merchandise 10. At that instant, the suction system and timer 54 are actuated, causing the air to be drawn out from between the sheet of plastic film 46 and the backing boards 12, and causing the atmospheric pressure above the sheet of plastic film 46 to "drape" the film closely about the articles of merchandise 10. The atmospheric pressure also forces the sheet of plastic film into intimate contact with the top surface of backing boards 12 around the articles of merchandise 10, resulting in a good bond between the plastic film and the backing boards.

The time during which heat is applied to the sheet of plastic film 46 by the heating units 50 should be such that the plastic film achieves a maximum degree of pliability. Ordinarily, it is possible to know when the maximum degree of pliability has been achieved by observing the sheet of plastic film. When heat is first applied to the sheet of plastic film, the film will begin to sag. With continued application of heat, the film will tighten up and then will begin to sag a *second* time. It is at the instant of commencement of the second sag that the sheet of plastic film has achieved maximum pliability. It is at this instant that the sheet of plastic film should be allowed to drop and "drape" over the backing boards and the article of merchandise. If a heat timer is employed, the timer should be set to drop the clamping frame 44 and the sheet of plastic film 46 at this instant.

The actual length of time required to heat the sheet of plastic film to maximum pliability will depend somewhat on the nature and the thickness of the plastic film. Naturally, the thicker the sheet of plastic film, the longer will be the heating time required in order to achieve a state of maximum pliability. Moreover, the heating of the sheet of plastic film should not be discontinued at the instant the plastic film is allowed to drape over the backing boards and the articles of merchandise. The heating should be continued for a few seconds after the sheet of plastic film is dropped into contact with the backing boards and the articles of merchandise, during which time the pressure differential is applied to order to force the plastic film into intimate contact with the backing boards and the articles of merchandise. A typical period of time during which the heating and the pressure differential should *both* be applied is five seconds.

The following table, given as a guide for the use of the Poly-Tite Packaging Machine model 500–C, is typical of the heating times required for two different types of plastic films. These periods of time should be allowed for the heating of the plastic film *before* it is draped over the backing boards and the articles of merchandise. In each case, the electric current should be allowed to flow through heating units 50 for an *additional* period of approximately five seconds after the plastic film has been dropped and during which additional period the suction system is in operation.

*Type of plastic-film material*

| Film thickness, mils | Polyethylene Treated by Electrical Discharge of Corona (CONOFORM AA), seconds | Vinyl, seconds |
| --- | --- | --- |
| 4 | 10 | 3 |
| 6 | 12 | 4 |
| 8 | 15 | 7 |

It has been explained that the period of time during which the heat and the suction should *both* be applied (concurrently) is approximately five seconds. Usually it will be found advantageous to continue the application of the suction *after* the heating has been discontinued. The following table gives typical periods of such *additional* time during which the suction should be applied, as determined by a suction timer 54:

| Film thickness, mils: | Additional time for application of suction, seconds |
| --- | --- |
| 4 | 3 |
| 6 | 8 |
| 8 | 13 |

The pressure differential which should be applied between the top and bottom surfaces of the packages in formation depends to some extent upon the height to which the articles of merchandise extend above the surface of the backing boards. The pressure differential also depends upon the thickness of the plastic film employed in the packages. In general, for a plastic film of 4-mil thickness used in packaging small objects (such as kitchen-sink spray heads) a pressure differential of five pounds per square inch is adequate. On the other hand, for a plastic film of 8-mil thickness used in packaging comparatively large objects (such as toilet seats) a pressure differential of ten to fifteen pounds per square inch may be found desirable.

When the heating of the plastic film by heating units 50 has ceased, the packages may be allowed to begin to cool. When the pressure differential has been applied by the suction system for a sufficient time to draw the plastic film down into intimate contact with the articles of merchandise and the backing boards, the most important processing steps on the packages are substantially complete. The packages of merchandise then may be removed from the packaging machine and allowed to finish cooling. If desired, forced-air cooling may be applied to the packages of merchandise. The cycle of pre-treatment and of operation of the packaging machine may then be repeated with fresh backing boards and articles of merchandise.

It may be helpful to recapitulate the following details of a typical series of steps according to particular preferred practice of my invention:

| | |
| --- | --- |
| Article of merchandise | Kitchen-sink spray head. |
| Type of backing board | One-eighth-inch corrugated board faced with porous paper and perforated. |
| Type of plastic film | 4-mil CONOFORM AA (polyethylene treated by electrical discharge). |
| Pre-treatment | Dehumidification of spray head and backing board and preheating for 30 seconds under infra-red lamps. |
| Time of heating film during actual packaging | 15 seconds. |
| Time of application of suction during actual packaging | 8 seconds. |
| Pressure differential | 5 pounds per square inch. |

For larger or heavier articles of merchandise, modifications of these steps may be made in accordance with the foregoing typical tables.

In skin-packaging processes, it is possible to employ backing boards which have heat-seal coatings applied to their surface which is to be contacted by the plastic film material. These heat-seal coatings are activated by the heat from the hot plastic film, and promote the adhesion of the plastic film to the backing boards. Ordinarily I do not prefer to use such heat-seal coatings. Rather, I prefer to use plastic-film materials which have themselves been activated to facilitate adhesion to the backing boards. Inasmuch as such materials are usually activated on only *one* surface, care must be taken to apply the *activated* surface to the backing boards.

By pre-treating the articles of merchandise and the backing boards, and by following the packaging steps as described in the foregoing specification, I have been able to achieve skin packages of merchandise which are strong, permanent, and attractive. They are packages in which some of the plastic-film material diffuses into the pores of the backing boards and grips them securely. Hence, they are packages in which the plastic-film material will not strip away from the backing boards, leaving the articles of merchandise free to cause further damage to the packages. The packages are especially well formed if the articles of merchandise are arranged in a staggered fashion on the perforated platen before the sheet of plastic film is draped over them, thereby avoiding any possibility of "webbing" of the plastic film. Thus, the objects of my invention have been fulfilled by the methods and packages disclosed in this specification.

What I claim as new and desire to secure by Letters Patent of the United States is as follows:

1. In a process for packaging articles of merchandise between a backing board and a sheet of thermoplastic film which has been treated on at least one surface to adhere to materials without the aid of further adhesive agents, the surface of said backing board adjacent said articles also being untreated with adhesive, the steps of: positioning at least one said article on the surface of said backing board; preheating said article and said backing board by applying heat to respective surfaces of said article and said backing board; heating a sheet of thermoplastic film; draping said heated sheet of thermoplastic film over said article and said backing board; mechanically supporting said article and said backing board and simultaneously drawing said sheet of thermoplastic film closely to the surface of said article and of said backing board by means of a pressure differential across the combination of said sheet of thermoplastic film, said article, and said backing board.

2. In a process for packaging an article of merchandise between a backing board and a sheet of thermoplastic film which has been treated on at least one surface to adhere to materials without the aid of further adhesive agents, the surface of said backing board adjacent said article also being untreated with adhesive, the steps of: positioning said article on the surface of said backing board; preheating and drying said article and said backing board; heating a sheet of thermoplastic film; draping said heated sheet of thermoplastic film over said article and said backing board; mechanically supporting said article and said backing board, and simultaneously drawing said sheet of thermoplastic film closely to the surface of said article and of said backing board by means of a pressure differential across the combination of said sheet of thermoplastic film, said article, and said backing board.

3. In a process for packaging an article of merchandise between a backing board and a sheet of thermoplastic film which has been treated on at least one surface to adhere to materials without the aid of further adhesive agents, the surface of said backing board adjacent said article also being untreated with adhesive, the steps of: positioning said article on the surface of said backing board; preheating said article and said backing board; heating a sheet of thermoplastic film; draping said heated sheet of thermoplastic film over said article and said backing board; mechanically supporting said article and said backing board while simultaneously pressing said sheet of thermoplastic film closely to a portion of the surface of said backing board by means of a pressure differential across the combination of said sheet of thermoplastic film, said article, and said backing board; and allowing said combination to cool.

4. A process in accordance with claim 3 in which a portion of the material of said thermoplastic film is caused to diffuse into the material of said backing board.

5. A process in accordance with claim 3 in which said backing board is formed of porous corrugated paper.

6. A process in accordance with claim 3 in which said backing board is fabricated from corrugated paper faced with a layer of printed paper, at least the layer of printed paper having perforations therethrough.

7. A process in accordance with claim 3 in which said backing board is composed of corrugated paper having perforations at least part way therethrough.

8. A process in accordance with claim 3 in which the steps are executed in an atmosphere which is characterized by a lower humidity than that of the ambient air.

References Cited by the Examiner

UNITED STATES PATENTS

| | | | |
|---|---|---|---|
| 2,855,735 | 10/1958 | Groth | 53—22 |
| 2,861,405 | 11/1958 | Hanford | 53—22 |
| 2,912,805 | 11/1959 | Maynard | 53—112 X |
| 2,931,495 | 4/1960 | Stratton | 206—80 |
| 3,090,484 | 5/1963 | Scholl | 206—80 |
| 3,096,602 | 7/1963 | Newmaker | 53—22 |

FOREIGN PATENTS 784,503   10/1957   Great Britain.

TRAVIS S. McGEHEE, *Primary Examiner.*

EARLE J. DRUMMOND, *Examiner.*

W. T. DIXSON, *Assistant Examiner.*